(12) United States Patent
Keipert et al.

(10) Patent No.: US 9,017,150 B2
(45) Date of Patent: Apr. 28, 2015

(54) METHOD OF MAKING A COATED ABRASIVE ARTICLE HAVING SHAPED ABRASIVE PARTICLES AND RESULTING PRODUCT

(75) Inventors: Steven J. Keipert, Somerset, WI (US); Ernest L. Thurber, Somerset, WI (US); Thomas J. Anderson, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 404 days.

(21) Appl. No.: 13/503,091

(22) PCT Filed: Nov. 23, 2010

(86) PCT No.: PCT/US2010/057829
§ 371 (c)(1),
(2), (4) Date: Apr. 20, 2012

(87) PCT Pub. No.: WO2011/068724
PCT Pub. Date: Jun. 9, 2011

(65) Prior Publication Data
US 2012/0231711 A1    Sep. 13, 2012

Related U.S. Application Data

(60) Provisional application No. 61/265,995, filed on Dec. 2, 2009.

(51) Int. Cl.
*B24D 11/00* (2006.01)
*C09K 3/14* (2006.01)

(52) U.S. Cl.
CPC ............ *B24D 11/001* (2013.01); *C09K 3/1409* (2013.01)

(58) Field of Classification Search
CPC .................. B24D 11/001; B24D 18/0072
USPC ............ 451/533, 534, 539; 51/293, 295, 298, 51/309
See application file for complete search history.

(56) References Cited

U.S. PATENT DOCUMENTS

| 4,734,104 | A |   | 3/1988  | Broberg |   |
|-----------|---|---|---------|---------|---|
| 5,078,753 | A | * | 1/1992  | Broberg et al. ................ 51/298 |
| 5,201,916 | A | * | 4/1993  | Berg et al. ....................... 51/293 |
| 5,336,523 | A |   | 8/1994  | Chater |   |
| 5,352,254 | A |   | 10/1994 | Celikkay |   |
| 5,366,523 | A |   | 11/1994 | Rowenhorst |   |

(Continued)

FOREIGN PATENT DOCUMENTS

| EP | 0 471 389 | 2/1992 |
| EP | 0 480 133 | 4/1992 |

(Continued)

*Primary Examiner* — Lee D Wilson
*Assistant Examiner* — Tyrone V Hall, Jr.
(74) *Attorney, Agent, or Firm* — Scott A. Baum; David B. Patchett

(57) ABSTRACT

A method of making a coated abrasive article includes the steps of: applying a make coat to a first major surface of a backing; applying shaped abrasive particles to the make coat to form a first abrasive layer consisting essentially of shaped abrasive particles; applying diluent particles to the make coat over the shaped abrasive particles to form a final abrasive layer; applying a size coat over the final abrasive layer; curing the make and size coats; and wherein the shaped abrasive particles comprise a vertex opposite a base and a width of the shaped abrasive particle tapers from the base to the vertex.

13 Claims, 3 Drawing Sheets

(56) References Cited

U.S. PATENT DOCUMENTS

| | | | |
|---|---|---|---|
| 5,496,386 A * | 3/1996 | Broberg et al. | 51/295 |
| 5,584,896 A * | 12/1996 | Broberg et al. | 51/295 |
| 5,695,533 A | 12/1997 | Kardys | |
| 5,885,311 A * | 3/1999 | McCutcheon et al. | 51/295 |
| 5,914,299 A * | 6/1999 | Harmer et al. | 51/298 |
| 6,217,432 B1 * | 4/2001 | Woo | 451/534 |
| 8,764,865 B2 * | 7/2014 | Boden et al. | 51/309 |
| 2009/0165394 A1 * | 7/2009 | Culler et al. | 51/296 |
| 2009/0169816 A1 * | 7/2009 | Erickson et al. | 428/142 |
| 2009/0235591 A1 * | 9/2009 | Yener et al. | 51/308 |
| 2010/0151196 A1 * | 6/2010 | Adefris et al. | 428/142 |
| 2012/0137597 A1 * | 6/2012 | Adefris et al. | 51/309 |

FOREIGN PATENT DOCUMENTS

| | | |
|---|---|---|
| EP | 0615 816 | 9/1994 |
| WO | WO 94/02559 | 2/1994 |
| WO | WO 95/20469 | 8/1995 |
| WO | WO 97/14536 | 4/1997 |
| WO | WO 2010/077519 | 7/2010 |

* cited by examiner

METHOD OF MAKING A COATED ABRASIVE ARTICLE HAVING SHAPED ABRASIVE PARTICLES AND RESULTING PRODUCT

CROSS REFERENCE TO RELATED APPLICATIONS

This application is a national stage filing under 35 U.S.C. 371 of PCT/US2010/057829 filed Nov. 23, 2010, which claims priority to Provisional Patent Application No. 61/265,995, filed Dec. 2, 2009, the disclosures of which are incorporated by reference in their entirety herein.

BACKGROUND

Abrasive particles and abrasive articles made from the abrasive particles are useful for abrading, finishing, or grinding a wide variety of materials and surfaces in the manufacturing of goods. As such, there continues to be a need for improving the cost, performance, or life of the abrasive particle and/or the abrasive article.

Triangular shaped abrasive particles and abrasive articles using the triangular shaped abrasive particles are disclosed in U.S. Pat. No. 5,201,916 to Berg; U.S. Pat. No. 5,366,523 to Rowenhorst (Re 35,570); and U.S. Pat. No. 5,984,988 to Berg. In one embodiment, the abrasive particles' shape comprised an equilateral triangle. Triangular shaped abrasive particles are useful in manufacturing abrasive articles having enhanced cut rates.

SUMMARY

Shaped abrasive particles, in general, can have superior performance over randomly crushed abrasive particles. By controlling the shape of the abrasive particle, it is possible to control the resulting performance of the abrasive article.

Abrasive article constructions comprising a mixture of a high performance crushed abrasive grain, such as a sol gel derived ceramic abrasive grain, and a lower performance or nonabrasive, low cost, diluent grains are known. These mixtures can provide enhanced value, (i.e. abrading performance/cost ratio), as well as controlled abrasive breakdown rates. These abrasive article constructions are prepared by either coating a blend of the two or more grains in a single coating operation or by a double coating process. In the double coating process, the lower performance diluent grain is coated first, usually by a drop coating process. The higher performance abrasive grain is then electrostatically coated on top of the diluent grain onto the remaining uncoated areas of the make resin. Coating crushed, sol gel derived abrasive grains in this order has proved to provide a coated abrasive article with superior sharpness and cut performance due to optimized orientation of the high performance grains.

The inventors have also discovered the advantages provided by a mixed grain construction are also present when the high performance abrasive grain is a shaped abrasive particle. The inventors have discovered that by applying a certain specific subset of the shaped abrasive particles to the backing layer first and then applying diluent particles to the backing, what will hereafter be called a "reverse double coat", significantly improved grinding performance of the coated abrasive article results. With other shaped abrasive grains, outside of this defined subset, as well as with conventional crushed grains, no such performance advantages are obtained through application of the reverse double coat method.

The subset of shaped abrasive particles for which the reverse double coating method provides an advantage are shaped abrasive particles having a vertex (or imaginary vertex if truncated) opposite a high surface area base such that a width of the shaped abrasive particle tapers from the base to the vertex. The base can comprise a polygon shape and frequently the base is shaped as a triangle, a square, a rectangle or a trapezoid. The longitudinal axis of the shaped abrasive particle is often substantially perpendicular to the base and passes through the vertex. Shaped abrasive particles useful in the claimed method include such shapes as equilateral and isosceles triangular prisms, elongated pentagonal prisms and the truncated pyramids derived from them, tetrahedrons and elongated tetrahedrons, elongated pyramids with polygonal bases and cones whose height exceeds their base diameter.

The performance advantage provided by the reverse double coat method is greatest when the final abrasive layer is a "closed coat" and all available make resin surface is coated with either shaped abrasive particles or diluent particles. For extremely open coats, it has been found that the performance of constructions made by any of the three coating methods is comparable. The reverse double coat method typically exhibits superior performance between 40 percent closed coat and 100 percent closed coat of the final abrasive layer. In many embodiments, the final abrasive layer is a closed coat construction having 100 percent of the make layer covered by shaped abrasive particles or diluent particles.

The reverse double coat method is particularly advantageous when the shaped abrasive particles in the first abrasive layer are coated to a level of 70 percent or less of its closed coat density and desirably 30 percent to 60 percent of its closed coat density. Additionally, superior performance is achieved when the diluent particle, as applied to the backing, have a shorter height than the vertexes of the shaped abrasive particles attached to the backing. This can be achieved by screening the diluent particles to a smaller mesh size than the shaped abrasive particles. In some embodiments, the largest dimension of the diluent particles is less than the length of the shaped abrasive particles along the longitudinal axis.

When shaped abrasive particles are used to make a coated abrasive article, typically an electrostatic field is used to pick up and move the shaped abrasive particles into contact with the resin comprising the make coat to adhere them to a backing. When triangular shaped abrasive particles are coated, as more particles are applied, some of the triangles will begin to fill in between existing shaped abrasive particles or diluent particles with their point attached to the make coat and the base of the triangle exposed to the grinding face as seen in FIG. 3 of U.S. Pat. No. 5,584,896 and FIG. 3 of U.S. Pat. No. 5,366,523. This effect is especially pronounced in closed coat constructions of the coated abrasive article wherein virtually the entire grinding face of the coated abrasive article is covered with either shaped abrasive particles or diluent particles. For some applications, reduced grinding performance occurs when horizontal surfaces, such as the triangle's base instead of the triangle's points, are present on the grinding face.

By applying the shaped abrasive particles to the make coat first, more shaped abrasive particles are orientated with the base attached to the make coat and a point or a vertex of the shaped abrasive particle exposed to the grinding face of the coated abrasive article. This process works especially well when an open coat of shaped abrasive particles are applied to the make coat and then a closed coated of diluent particles are applied over the shaped abrasive particles.

Particularly improved results occur with the claimed method when the shaped abrasive particles have a sloping sidewall. By coating the shaped abrasive particles first onto the make coat in an open coat, the shaped abrasive particles can tip or lean by being attached to the make coat by the sloping sidewall acting as a base. Thereafter, the diluent particles can fill in the spaces between the leaning shaped abrasive particles. When the process is repeated in reverse by coating the diluent particles first, the presence of the diluent particles not only causes the wrong end of the shaped abrasive particle to be attached to the make coat, they also prevent the shaped abrasive particles from tipping or leaning in their attachment to the make coat.

Hence, in one embodiment, the invention resides in a method of making a coated abrasive article including the steps of: applying a make coat to a first major surface of a backing; applying shaped abrasive particles to the make coat to form a first abrasive layer consisting essentially of shaped abrasive particles; applying diluent particles to the make coat over the shaped abrasive particles to form a final abrasive layer; applying a size coat over the final abrasive layer; curing the make and size coats; and wherein the shaped abrasive particles comprise a vertex opposite a base and a width of the shaped abrasive particle tapers from the base to the vertex.

BRIEF DESCRIPTION OF THE DRAWINGS

It is to be understood by one of ordinary skill in the art that the present discussion is a description of exemplary embodiments only, and is not intended as limiting the broader aspects of the present disclosure, which broader aspects are embodied in the exemplary construction.

Figure 1A:
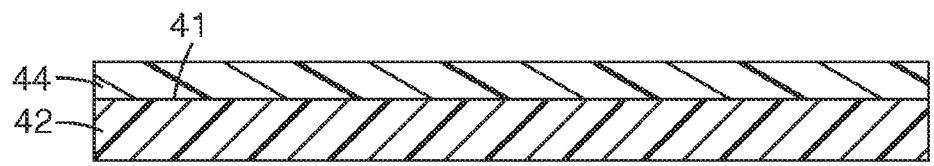
FIG. 1A illustrates one step in the making of a coated abrasive article.

Repeated use of reference characters in the specification and drawings is intended to represent the same or analogous features or elements of the disclosure.

DEFINITIONS

As used herein, forms of the words "comprise", "have", and "include" are legally equivalent and open-ended. Therefore, additional non-recited elements, functions, steps or limitations may be present in addition to the recited elements, functions, steps, or limitations.

As used herein, the term "abrasive dispersion" means an alpha alumina precursor that can be converted into alpha alumina that is introduced into a mold cavity. The composition is referred to as an abrasive dispersion until sufficient volatile components are removed to bring solidification of the abrasive dispersion.

As used herein, the term "precursor shaped abrasive particle" means the unsintered particle produced by removing a sufficient amount of the volatile component from the abrasive dispersion, when it is in the mold cavity, to form a solidified body that can be removed from the mold cavity and substantially retain its molded shape in subsequent processing operations.

As used herein, the term "shaped abrasive particle", means a ceramic abrasive particle with at least a portion of the abrasive particle having a predetermined shape that is replicated from a mold cavity used to form the precursor shaped abrasive particle. Except in the case of abrasive shards (e.g. as described in U.S. provisional application 61/016,965), the shaped abrasive particle will generally have a predetermined geometric shape that substantially replicates the mold cavity that was used to form the shaped abrasive particle. Shaped abrasive particle as used herein excludes abrasive particles obtained by a mechanical crushing operation.

Exemplary shaped abrasive particles are disclosed in U.S. Pat. No. 5,201,916 to Berg; U.S. Pat. No. 5,366,523 to Rowenhorst (Re 35,570); and U.S. Pat. No. 5,984,988 to Berg; and in the following pending patent applications: U.S. patent application Ser. No. 12/337,075 entitled "Shaped Abrasive Particles With A Sloping Sidewall", filed on Dec. 17, 2008; U.S. Patent application Ser. No. 12/336,961 entitled "Dish-Shaped Abrasive Particles With A Recessed Surface", filed on Dec. 17, 2008; U.S. patent application Ser. No. 12/337,112 entitled "Shaped Abrasive Particles With An Opening", filed on Dec. 17, 2008; and in U.S. Patent Application Ser. No. 61/138,268 entitled "Shaped Abrasive Particles With Grooves" filed on Dec. 17, 2008.

As used herein, the term "diluent particles" means either: (1) a plurality of individual abrasive particles bonded together by an adhesive to form an agglomerate, (2) a plurality of individual non-abrasive particles bonded together by an adhesive to form an agglomerate, (3) a plurality of individual abrasive particles and a plurality of individual non-abrasive particles bonded together by an adhesive to form an agglomerate, (4) individual non-abrasive particles; (5) individual abrasive particles, or (6) combinations of the foregoing.

As used herein, "abrasive particles" have a Mohs hardness greater than or equal to 7 and "non-abrasive particles" have a Mohs hardness less than 7. Exemplary abrasive particles can include without limitation: fused aluminum oxide, silicon carbide, garnet, fused alumina zirconia, cubic boron nitride, and diamond. Exemplary non-abrasive particles can include without limitation: solid particles or hollow bubbles of glass, mullite, gypsum, marble, cryolite, and resin or plastic materials.

DETAILED DESCRIPTION

Suitable Shaped Abrasive Particles

Figure 2A:
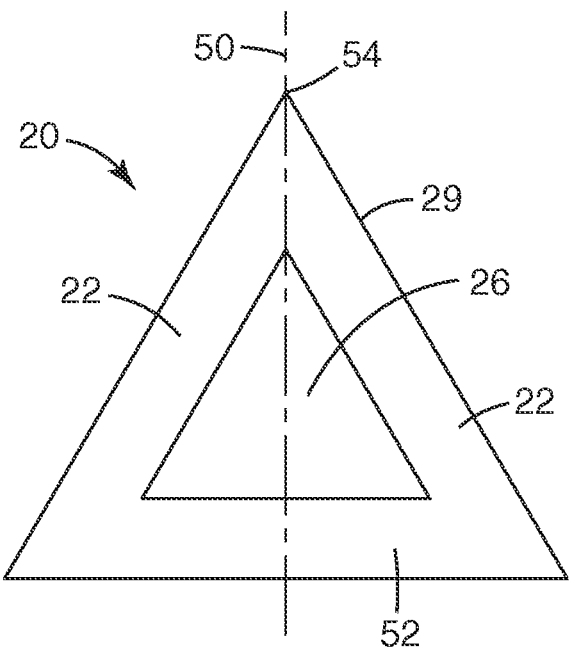
FIG. 2A illustrates a top view of a shaped abrasive particle.
Figure 2B:
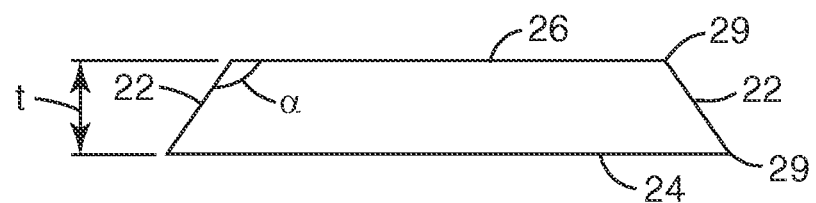
FIG. 2B illustrates a side view of the shaped abrasive particle of FIG. 2A.

Referring to FIGS. 2A and 2B, an exemplary shaped abrasive particle 20 is illustrated. In some embodiments, the shaped abrasive particle comprises a sidewall 22 having a draft angle α other than 90 degrees and referred to hereafter as a sloping sidewall. The material from which the shaped abrasive particle 20 is made comprises alpha alumina. Alpha alumina particles can be made from an abrasive dispersion of aluminum oxide monohydrate that is gelled, molded to shape, dried to retain the shape, calcined, and then sintered as discussed herein later. The shaped abrasive particle's shape is retained without the need for a binder to form an agglomerate comprising abrasive particles in a binder that are then formed into a shaped structure.

The shaped abrasive particle 20 comprises a longitudinal axis 50 extending from a base 52 to the grinding tip or vertex 54. The base 52 (in some embodiments, one of the sloping sidewalls 22) is typically attached to the backing 42 in the coated abrasive article 40 by the make coat 44. The subset of shaped abrasive particles for which the reverse double coating method provides utility include shaped abrasive particles having a base 52 opposite a vertex 54 such that a width of the shaped abrasive particle tapers from the base 52 to the vertex 54. This includes such shapes as equilateral and isosceles triangular prisms, elongated pentagonal prisms and the truncated pyramids derived from them, tetrahedrons and elongated tetrahedrons, elongated pyramids with polygonal bases and cones whose height exceeds their base diameter. In one embodiment, an equilateral triangular shaped abrasive particle having two substantially parallel faces of unequal areas, with each face having a triangular perimeter 29 and the shaped abrasive particle having a sloping sidewall 22 was used.

In one embodiment, the shaped abrasive particles 20 can comprise thin bodies having a first face 24, and a second face 26 and having a thickness t. In some embodiments, the thickness t ranges between about 25 micrometers to about 500 micrometers. The first face 24 and the second face 26 are connected to each other by at least one sidewall 22, which may be a sloping sidewall. In some embodiments, more than one sloping sidewall 22 can be present and the slope or angle for each sloping sidewall 22 may be the same or different as more fully described in pending U.S. patent application Ser. No. 12/337,075 filed on Dec. 17, 2008 entitled "Shaped Abrasive Particles With A Sloping Sidewall."

In some embodiments, the first face 24 is substantially planar, the second face 26 is substantially planar, or both faces are substantially planar. Alternatively, the faces could be concave or convex as discussed in more detail in copending U.S. patent application Ser. No. 12/336,961 entitled "Dish-Shaped Abrasive Particles With A Recessed Surface", filed on Dec. 17, 2008. A concave or recessed face can be created by selecting drying conditions for the sol gel while residing in the mold cavity that forms a meniscus in the sol gel tending to wick the edges of the sol gel up the sides of the mold as discussed in U.S. patent application Ser. No. 12/336,961. A concave surface on the first face 24 can help to increase the cutting performance in some applications similar to a hollow ground chisel blade. A concave or recessed face on the shaped abrasive particle can be used alone or with any of the features or combinations of features or embodiments shown or described in this patent application.

In one embodiment, the first face 24 and the second face 26 are substantially parallel to each other. In other embodiments, the first face 24 and the second face 26 can be nonparallel such that one face is sloped with respect to the other face and imaginary lines tangent to each face would intersect at a point. The sidewall 22 of the shaped abrasive particle 20 can vary and it generally forms the perimeter 29 of the first face 24 and the second face 26. In one embodiment, the perimeter 29 of the first face 24 and the second face 26 is selected to be a geometric shape, and the first face 24 and the second face 26 are selected to have the same geometric shape; although, they differ in size with one face being larger than the other face. In one embodiment, the perimeter 29 of first face 24 and the perimeter 29 of the second face 26 was a triangular shape that is illustrated.

The draft angle α between the second face 26 and the sidewall 22 of the shaped abrasive particle 20 can be varied to change the relative sizes of each face. In various embodiments of the invention, the draft angle α can be between approximately 90 degrees to approximately 135 degrees, or between approximately 95 degrees to approximately 130 degrees, or between about 95 degrees to about 125 degrees, or between about 95 degrees to about 120 degrees, or between about 95 degrees to about 115 degrees, or between about 95 degrees to about 110 degrees, or between about 95 degrees to about 105 degrees, or between about 95 degrees to about 100 degrees. As discussed in U.S. patent application Ser. No. 12/337,075, specific ranges for the draft angle α have been found to produce surprising increases in the grinding performance of coated abrasive articles made from the shaped abrasive particles with a sloping sidewall. In particular, draft angles of 98 degrees, 120 degrees, or 135 degrees have been found to have improved grinding performance over a draft angle of 90 degrees. The improvement in grinding performance is particularly pronounced at draft angles of 98 degrees or 120 degrees as seen in FIGS. 6 and 7 of U.S. patent application Ser. No. 12/337,075.

Additionally, one or more openings through the shaped abrasive particle passing through the first face 24 and the second face 26 could be present as discussed in more detail in copending U.S. patent application Ser. No. 12/337,112 entitled "Shaped Abrasive Particles With An Opening", filed on Dec. 17, 2008. An opening through the shaped abrasive particle can reduce the bulk density of the shaped abrasive particles thereby increasing the porosity of the resulting abrasive article in some applications, such as a grinding wheel, where increased porosity is often desired. Alternatively, the opening can reduce shelling by anchoring the shaped abrasive particle into the size coat more firmly or the opening can act as a reservoir for a grinding aid. An opening can be formed into the shaped abrasive particle by selecting drying conditions that exaggerate the meniscus phenomenon discussed above, or by making a mold having one or more posts extending from the bottom similar to a Bundt cake pan. Methods of making shaped abrasive particles with an opening are discussed in U.S. patent application Ser. No. 12/337,112. An opening on the shaped abrasive particle can be used alone or with any of the features or combinations of features or embodiments shown or described in this patent application.

Additionally, the shaped abrasive particles can have a plurality of grooves on the second side 26 as described in copending Provisional Application U.S. Ser. No. 61/138,268 entitled "Shaped Abrasive Particles With Grooves" filed on Dec. 17, 2008. The grooves are formed by a plurality of ridges in the bottom surface of the mold cavity that have been found to make it easier to remove the precursor shaped abrasive particles from the mold. It is believed that a ridge having a triangular shaped cross section acts as a wedge lifting the precursor shaped abrasive particle off of the mold's bottom surface under drying conditions that promote shrinkage of the sol gel while residing in the mold cavity. Grooves can be used alone or with any of features or combinations of features or embodiments shown or described in this patent application.

Blends of differently shaped abrasive particles 20 (equilateral triangles and isosceles triangles for example) or blends of shaped abrasive particles 20 with sloping sidewalls having different draft angles (for example shaped abrasive particles having a 98 degree draft angle mixed with shaped abrasive particles having a 120 degree draft angle) can be used in coated abrasive articles of this invention.

The shaped abrasive particles 20 may also have a surface coating. Surface coatings are known to improve the adhesion between abrasive grains and the binder in abrasive articles or can be used to aid in electrostatic deposition of the shaped abrasive particles 20. In one embodiment, surface coatings as described in U.S. Pat. No. 5,352,254 in an amount of 0.1%-2% inorganics to shaped abrasive particle weight were used. Such surface coatings are described in U.S. Pat. Nos. 5,213,591; 5,011,508; 1,910,444; 3,041,156; 5,009,675; 5,085,671; 4,997,461; and 5,042,991. Additionally, the surface coating may prevent the shaped abrasive particle from capping. Capping is the term to describe the phenomenon where metal particles from the workpiece being abraded become welded to the tops of the shaped abrasive particles. Surface coatings to perform the above functions are known to those of skill in the art.

Method of Making Shaped Abrasive Particles

Methods of making shaped abrasive particles are described in the exemplary patents referred to in the Definitions Section. Briefly, the method comprises the steps of making either a seeded or non-seed sol gel abrasive dispersion that can be converted into alpha alumina; filling one or more mold cavities having the desired outer shape of the shaped abrasive particle with the sol gel, drying the sol gel to form precursor shaped abrasive particles; removing the precursor shaped abrasive particles from the mold cavities; calcining the precursor shaped abrasive particles to form calcined, precursor shaped abrasive particles, and then sintering the calcined, precursor shaped abrasive particles to form shaped abrasive particles. Further information to make shaped abrasive particles is disclosed in copending U.S. patent application Ser. No. 12/337,001 entitled "Method Of Making Abrasive Shards, Shaped Abrasive Particles With An Opening, Or Dish-Shaped Abrasive Particles", filed on Dec. 17, 2008.

Method of Making Coated Abrasive Articles

Referring to FIGS. 1A-1D a partial sequence of steps to make a coated abrasive article is illustrated. The coated abrasive article 40 comprises a backing 42 having a first layer of binder, hereinafter referred to as the make coat 44, applied over a first major surface 41 of backing 42. Attached or partially embedded in the make coat 44 is a plurality of shaped abrasive particles 20 and a plurality of diluent particles 48 forming a final abrasive layer 49. Over the final abrasive layer 49 is a second layer of binder, hereinafter referred to as the size coat 46. The purpose of make coat 44 is to secure the shaped abrasive particles 20 and the diluent particles 48 to the backing 42, and the purpose of size coat 46 is to reinforce the shaped abrasive particles 20 and the diluent particles 48 in the final abrasive layer 49. An optional super size coating, as known to those of skill in the art, may also be applied.

Figure 1B:
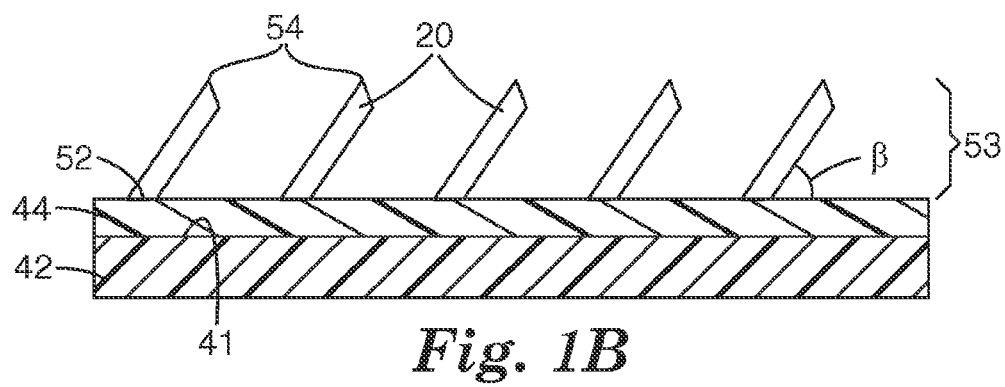
FIG. 1B illustrates a subsequent step in the making of a coated abrasive article.

Referring to FIG. 1A a make coat 44 is applied to a first major surface 41 of backing 42. Then, as shown in FIG. 1B, only the shaped abrasive particles 20 are first applied to the make coat 44 forming a first abrasive layer 53. Electrostatic application, known to those of skill in the art, is used to properly orient the vertex 54 and base 52 of the shaped abrasive particles such that at least a majority of the shaped abrasive particles are attached by their base 52 to the make coat. In various embodiments of the invention, greater than 70, 75, 80, 85, 90, or 95 percent of the shaped abrasive particles are attached by their base 52 to the make coat 44.

Figure 3:
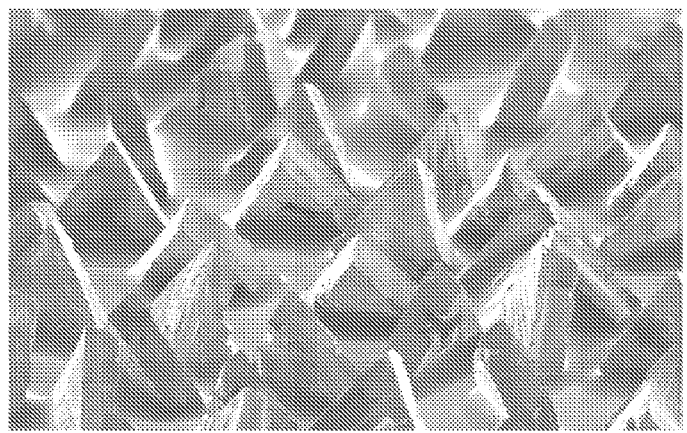
FIG. 3 illustrates a photomicrograph of a coated abrasive article illustrating the tipping and leaning of the shaped abrasive particles in an open coat abrasive layer.

Desirably, the first abrasive layer 53 is an open coat first abrasive layer. An open coat first abrasive layer will result in less than 100% coverage of the make coat with shaped abrasive particles thereby leaving open areas and a visible resin layer between the abrasive particles as best seen in FIG. 3. In various embodiments of the invention, the percent open area in the first abrasive layer 53 can be between about 10 percent to about 70 percent or between about 30 percent to about 60 percent.

An open coat abrasive layer allows for shaped abrasive particles with a sloping sidewall to attach to the make coat by the base 52 and then tip or lean such that a majority of the shaped abrasive particles have an orientation angle β in the first abrasive layer 53. Applying diluent particles first or a blend of diluent particles and shaped abrasive particles is believed to interfere with the tipping thereby reducing performance of the coated abrasive article. As seen in FIG. 3, the majority (greater than 50%) of the shaped abrasive particles 20 with a sloping sidewall 22 are tipped or leaning to one side. This results in the majority of the shaped abrasive particles 20 with a sloping sidewall 22 having an orientation angle β less than 90 degrees relative to the first major surface 41 of the backing 42. As seen in FIG. 3, not only are all of the shaped abrasive particles tipped or leaning, but they are all tipping or leaning by substantially the same amount. The precise control of the degree of tipping, as controlled by draft angle α, is believed to significantly increase the grinding performance.

It is believed that if too many of the shaped abrasive particles with a sloping sidewall are applied to the backing, insufficient space between the shaped abrasive particles will be present to allow for them to lean or tip prior to curing the make and size coats. In various embodiments of the invention, greater than 50, 60, 70, 80, or 90 percent of the shaped abrasive particles in the coated abrasive article having an open coat first abrasive layer are tipped or leaning having an orientation angle β of less than 90 degrees.

Without wishing to be bound by theory, it is believed that an orientation angle β of less than 90 degrees results in enhanced cutting performance of the shaped abrasive particles with a sloping sidewall. In various embodiments of the invention, the orientation angle β for at least a majority or greater than 50, 60, 70, 80, or 90 percent of the shaped abrasive particles with a sloping sidewall in an abrasive layer of a coated abrasive article can be between about 50 degrees to about 85 degrees, or between about 55 degrees to about 85 degrees, or between about 60 degrees to about 85 degrees, or between about 65 degrees to about 85 degrees, or between about 70 degrees to about 85 degrees, or between about 75 degrees to about 85 degrees, or between about 80 degrees to about 85 degrees.

Figure 1C:
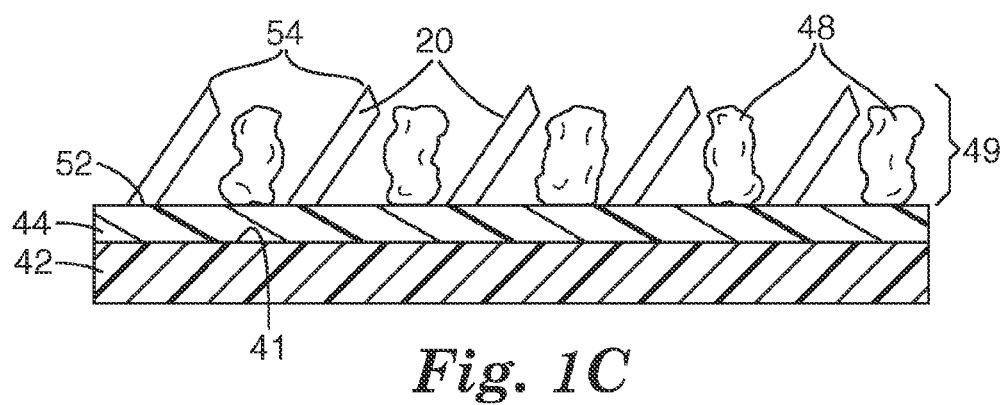
FIG. 1C illustrates another subsequent step in the making of a coated abrasive article.
Figure 1D:
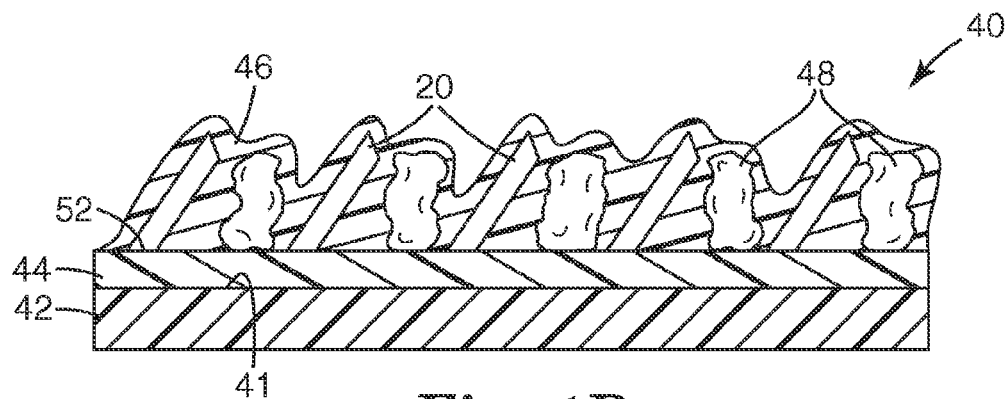
FIG. 1D illustrates another subsequent step in the making of a coated abrasive article.

Referring to FIG. 1C, after applying only the shaped abrasive particles 20 to the make coat 44, the diluent particles 48 or blends of diluent particles are applied over the first abrasive layer 53 to the make coat. Since the diluent particles are not shaped by a mold, they often have a rounder shape with aspect ratios close to 1 and their orientation is not as critical. As such, the diluent particles can be either drop coated or electrostatically applied; however, diluent particles having an aspect ratio greater than about 1.2 are preferably electrostatically applied.

As seen in FIG. 1C, in some embodiments, superior performance is achieved when the diluent particles, as applied to the backing, have a shorter height than the vertexes 54 of the shaped abrasive particles attached to the backing. This can be achieved by screening the diluent particles to a smaller mesh size than the shaped abrasive particles. In some embodiments, the largest dimension of the diluent particles is less then the length of the shaped abrasive particles along the longitudinal axis.

After attaching the diluent particles 48, and optionally curing the make coat at least partially, a size coat 46 is applied over the final abrasive layer 49. Thereafter, the make and size coats are cured and further conventional processing as known to those of skill in the art can be used to make the finished abrasive article.

Conventional backings such as paper, cloth, plastic, and films can be used along with conventional make and size coat resins such as phenolic resins, epoxy resins, urea-formaldehyde resins, acrylate resins, aminoplast resins, melamine resins, acrylated epoxy resins, urethane resins and combinations thereof. The make coat or size coat, or both coats, may further comprise additives that are known in the art, such as, for example, fillers, grinding aids, wetting agents, surfactants, dyes, pigments, coupling agents, adhesion promoters, and combinations thereof.

EXAMPLES

Objects and advantages of this disclosure are further illustrated by the following non-limiting examples. The particular materials and amounts thereof recited in these examples as well as other conditions and details, should not be construed to unduly limit this disclosure. Unless otherwise noted, all parts, percentages, ratios, etc. in the Examples and the rest of the specification are by weight.

TABLE 1

Materials

| Abbreviation | Description |
|---|---|
| PR1 | A base-catalyzed (2.5% KOH) 1.5:1 to 2.1:1 phenol-formaldehyde condensate, 75% in water. |
| CACO | Calcium carbonate, obtained as "HUBERCARB Q4" from Huber Engineered Materials, Atlanta, Georgia. |
| EC1 | 2,2-dimethoxy-2-phenylacetophenone, obtained as "IRGACURE 651" from Ciba Specialty Chemicals, Hawthorne, New York. |
| ER1 | Epoxy resin, obtained as "HELOXY 48" from Dow Chemical Company, Midland, Michigan. |
| TMPTA | Trimethylolpropane triacrylate, obtained as "SR351" from Sartomer Company, Exton, Pennsylvania. |
| CRY | Cryolite, obtained as "CRYOLITE TYPE RTN-C" from Koppers Trading, Pittsburg, Pennsylvania. |
| IO | Red iron oxide pigment. |
| ER2 | Aqueous epoxy dispersion, obtained as "CMD35201" from Rhone Poulenc, Inc., Louisville, Kentucky. |
| EC2 | 2-ethyl-4-methyl imidazole, obtained as "EMI-24" from Air Products, Allentown, Pennsylvania. |
| KBF4 | Potassium tetrafluoroborate, 98% pure, micropulverized such that 95% by weight passes through a 325 mesh screen and 100% passes through a 200 mesh screen. |
| AG1 | Equilateral triangular shaped abrasive particles −20 + 26 mesh size having approximately: a 98 degree draft angle, a side length of 0.110" (2.80 mm), and a thickness of 0.012" (0.3 mm) |
| AG2 | Blend of pyramidal shaped abrasive particles with a rhombus first side, and four facets forming a vertex on the second side; the blend was approximately 2/3 shaped abrasive particles having a screen size of −70 + 80 made from a mold having a maximum cavity length of 0.76 mm, a maximum cavity width of 0.31 mm, and a cavity depth of 0.20 mm, and approximately 1/3 shaped abrasive particles having a screen size of −60 + 70 made from a mold having a maximum cavity length of 0.86 mm, a maximum cavity width of 0.31 mm, and a cavity depth of 0.20 mm. |
| AG3 | Grade 36 ceramic alumina particles, obtained as "CUBITRON 324AV" from 3M, Saint Paul, Minnesota. |
| FG1 | Calcium carbonate grain screened to a particle size range passed by a 20 mesh sieve and retained by a 25 mesh sieve. |
| FG2 | ANSI grade 36 fused brown aluminum oxide. |
| FG3 | Cryolite grain screened to a particle size range passed by a 20 mesh sieve and retained by a 25 mesh sieve. |
| FG4 | Calcium carbonate grain screened to a particle size range passed by a 30 mesh sieve and retained by a 35 mesh sieve. |
| FG5 | ANSI grade 36 granular sintered bauxite. |
| FG6 | ANSI grade 100 fused brown aluminum oxide. |

Surface Coating Treatment

The AG1 shaped abrasive particles were treated to enhance electrostatic application of the shaped abrasive particles in a manor similar to the method used to make CUBITON 324AV crushed abrasive particles as disclosed in U.S. Pat. No. 5,352,254. The calcined, precursor shaped abrasive particles are impregnated with a rare earth oxide (REO) solution comprising 1.4% MgO, 1.7% $Y_2O_3$, 5.7% $La_2O_3$ and 0.07% CoO. Into 70 grams of the REO solution, 1.4 grams of Hydral Coat 5 powder available from Almatis of Pittsburg, Pa. (approximately 0.5 micron mean particle size) is dispersed by stirring it in an open beaker. About 100 grams of calcined, precursor shaped abrasive particles is then impregnated with the 71.4 grams of the dispersed solution of Hydral Coat 5 powder in the REO solution. The impregnated, calcined, precursor shaped abrasive particles are then calcined again before sintering to final hardness.

Resins

Make Resin 1: A phenolic make resin which was prepared by mixing 49.2 parts by weight of PR1; 40.6 parts by weight of CACO; and 10.2 parts by weight deionized water.

Make Resin 2: A gelable make resin prepared dissolving with gentle heating 0.72 parts by weight EC1 in a mixture of 13.5 parts by weight of ER1 and 2.5 parts by weight of TMPTA. To this solution was added 30.8 parts by weight of PR1. To this mixture was added 42.3 parts by weight of CACO; and 7.25 parts by weight deionized water.

Size Resin 1: A size resin prepared by mixing 40.6 parts by weight of PR1; 69.9 parts by weight of CRY; 2.5 parts by weight of IO; and 25 parts by weight deionized water.

Supersize Resin 1: A supersize resin prepared by mixing 29.2 parts of ER2; 0.35 parts EC2; 53.3 parts KBF4; 14.1 parts deionized water; and 2.3 parts IO.

Disc Preparation Methods

Abrasive discs were prepared in three steps: 1) Preparation; 2) Particle Coating; and 3) Finishing. The Preparation step varied with the make coat composition and the Finishing step was the same for all methods. The Particle Coating steps differed for each method.

Disc Preparation Method A

This was the method used to prepare discs having a reverse double coat (RDC) construction incorporating a phenolic make resin.

Preparation: A precut vulcanized fibre disc blank with a diameter of 7 inches (17.8 cm), having a center hole of ⅞ inch (2.2 cm) diameter and a thickness of 0.83 mm (33 mils) obtained under the trade designation "DYNOS VULCANIZED FIBRE" from DYNOS GmbH, Troisdorf, Germany was used as the abrasive substrate. The fiber substrate was coated by brush with Make Resin 1 to a weight of 4.2+/−0.5 grams.

Particle Coating: The coated disc was weighed and premium abrasive particles (shaped abrasive particles or ceramic crushed abrasive grain) were applied using an electrostatic coater. The abrasive coated disc was removed and weighed to establish the quantity of abrasive grain coated. The disc was then laid flat and sprinkled with enough diluent filler grain to completely cover the disc surface. The disc was picked up, inverted and tapped gently to remove excess unbonded diluent filler grain. The disc was weighed to establish the amount of diluent filler grain coated.

Finishing: The disc was given a make pre-cure at 90 C for 1 hour followed by 103 C for 3 hours. The precured discs were then coated by brush with size resin. Excess size resin was removed with a dry brush until the flooded glossy appearance was reduced to a matte appearance. The size coated discs were weighed to establish the size resin weight. The amount of size resin added was dependent on the mineral composition and weights, but was typically between 12 and 28 grams per disc. The discs were cured for 90 minutes at 90 C, followed by 16 hours at 103 C. The discs were then optionally coated by brush with a supersize resin. The supersize coated discs received an additional cure at 125 C for 3 hours. The cured discs were orthogonally flexed over a 1.5 inch (3.8 cm) diameter roller. Discs were typically allowed to equilibrate with ambient humidity for 1 week before testing.

Disc Preparation Method B

This was the method used to prepare discs having a conventional double coat (DC) construction incorporating a phenolic make resin.

Preparation: Identical to that of Disc Preparation Method A

Particle Coating: The coated disc was weighed and then coated with a suitable amount of diluent filler grain using an electrostatic coater. The diluent filler grain-coated disc was removed and weighed to establish the quantity of diluent filler grain applied. The disc was returned to the electrostatic coater and coated with the premium abrasive particles (shaped abrasive particles or ceramic crushed abrasive grain). The disc was weighed to establish the amount of shaped abrasive particles coated.

Finishing: Identical to that of Disc Preparation Method A

Disc Preparation Method C

This was the method used to prepare discs having a conventional blended coat (BC) construction incorporating a phenolic make resin.

Preparation: Identical to that of Disc Preparation Method A

Particle Coating: The coated disc was weighed and then coated with a blend of diluent filler grain and premium abrasive particles (shaped abrasive particles or ceramic crushed abrasive grain) of known composition using an electrostatic coater. Typically, a mineral blend containing 5% by weight excess blended mineral was coated to allow for abrasive grain which was not picked up by the disc. The blended mineral coated disc was removed and weighed to establish the quantity of blended mineral coat.

Finishing: Identical to that of Disc Preparation Method A

Disc Preparation Method D

This was the method used to prepare discs having a reverse double coat construction (RDC) incorporating a gellable make resin.

Preparation: Identical to that of Disc Preparation Method A with the exception that Make Resin 2 was substituted for Make Resin 1.

Particle Coating: The make resin was gelled by irradiation with an ultraviolet (UV) lamp, type "D" bulb, from Fusion Systems Inc., at 6.1 m/min and 118 Watts/cm.$^2$ (118 J/cm.$^2$-sec). The make coated disc was weighed and premium abrasive particles (shaped abrasive particles or ceramic crushed abrasive grain) were applied using an electrostatic coater. The abrasive coated disc was removed and weighed to establish the quantity of shaped abrasive particles coated. The disc was then laid flat and sprinkled with enough diluent filler grain to completely cover the disc surface. The disc was picked up, inverted and tapped gently to remove excess unbonded diluent filler grain. The disc was weighed to establish the amount of diluent filler grain coated.

Finishing: Identical to that of Disc Preparation Method A.

Disc Preparation Method E

This was the method used to prepare discs having a conventional double coat (DC) construction incorporating a gellable make resin.

Preparation: Identical to that of Disc Preparation Method D.

Particle Coating: The make resin was gelled by irradiation with an ultraviolet (UV) lamp, type "D" bulb, from Fusion Systems Inc., at 6.1 m/min and 118 Watts/cm.$^2$ (118 J/cm.$^2$-sec). The coated disc was weighed and then coated with a suitable amount of diluent filler grain using an electrostatic coater. The diluent filler grain coated disc was removed and weighed to establish the quantity of diluent filler grain coated. The disc was returned to the electrostatic coater and coated with the premium abrasive particles (shaped abrasive particles or ceramic crushed abrasive grain). The disc was weighed to establish the amount of the shaped abrasive particles coated.

Finishing: Identical to that of Disc Preparation Method A

Disc Preparation Method F

This was the method used to prepare discs having a conventional blended coat construction incorporating a gellable make resin.

Preparation: Identical to that of Disc Preparation Method D.

Particle Coating: The make resin was gelled by irradiation with an ultraviolet (UV) lamp, type "D" bulb, from Fusion Systems Inc., at 6.1 m/min and 118 Watts/cm.$^2$ (118 J/cm.$^2$-sec). The coated disc was weighed and a blend of diluent filler grain and premium abrasive particles (shaped abrasive particles or ceramic crushed abrasive grain) of known composition was applied using an electrostatic coater. Typically, a mineral blend containing 5% by weight excess abrasive grain was coated to allow for abrasive grain which was not picked up by the disc. The blended mineral coated disc was removed and weighed to establish the quantity of blend mineral coated.

Finishing: Identical to that of Disc Preparation Method A.

Disc Preparation Method G

This was the method used to prepare discs having a single open coat construction, without diluent filler grain, incorporating a phenolic make resin.

Preparation: Identical to that of Disc Preparation Method A.

Particle Coating: The coated disc was weighed and premium abrasive particles (shaped abrasive particles or ceramic crushed abrasive grain) were applied using an electrostatic coater. The abrasive coated disc was removed and weighed to establish the quantity of shaped abrasive particles coated.

Finishing: Identical to that of Disc Preparation Method A.

Disc Preparation Method H

This was the method used to prepare discs having a single open coat construction, without diluent filler grain, incorporating a gellable make resin.

Preparation: Identical to that of Disc Preparation Method D.

Particle Coating: The make resin was gelled by irradiation with an ultraviolet (UV) lamp, type "D" bulb, from Fusion Systems Inc., at 6.1 m/min and 118 Watts/cm.$^2$ (118 J/cm.$^2$-sec). The coated disc was weighed and then coated with premium abrasive particles (shaped abrasive particles or ceramic crushed abrasive grain) using an electrostatic coater. The abrasive coated disc was removed and weighed to establish the quantity of the shaped abrasive particles coated.

Finishing: Identical to that of Disc Preparation Method A.

Hydraulic Slide Action Test Method

This test, designed to measure the cut rate of coated abrasive discs, was used to compare the abrading efficacy of the inventive and comparative abrasive discs. The abrasive discs, 7-inch diameter×⅞-inch center hole (18 cm diameter×2.2 cm center hole) discs, prepared by Disc Preparation Methods A through H, were used to grind the face of a 1.25 cm by 18 cm 1018 mild steel or 304 stainless steel workpiece. The grinder used was a constant load hydraulic disc grinder. A constant known load between each workpiece and abrasive disc was maintained. The load range was typically between 12 and 19 pounds force (53 to 85 N). The back-up pad for the grinder was an aluminum back-up pad. The disc was secured to the aluminum pad by a retaining nut and was driven at a constant speed of 5,000 rpm. During operation, the test disc was tilted ("heeled") at approximately 7 degrees to present an abrasive band extending 3.5 cm from the edge and in towards the center to the workpiece. During testing, the workpiece was traversed along its length at a rate of about 8.4 cm per second. Each disc was used to grind a separate workpiece for successive 1 or 2 minute intervals. Cut was determined for each additional grinding interval until an endpoint was reached. The endpoint was typically a fixed cut rate (i.e. 70 grams/cycle) or a percentage of the initial cut rate (i.e. 70% of initial cut). Disc performance was reported as the initial cut in the first 1 (or 2) minute cycle, peak cut, or highest cut obtained in any cycle, total cumulative cut, and total number of cycles to reach the defined endpoint.

Examples 1-9 and Comparative Examples A-J

Figure 4:
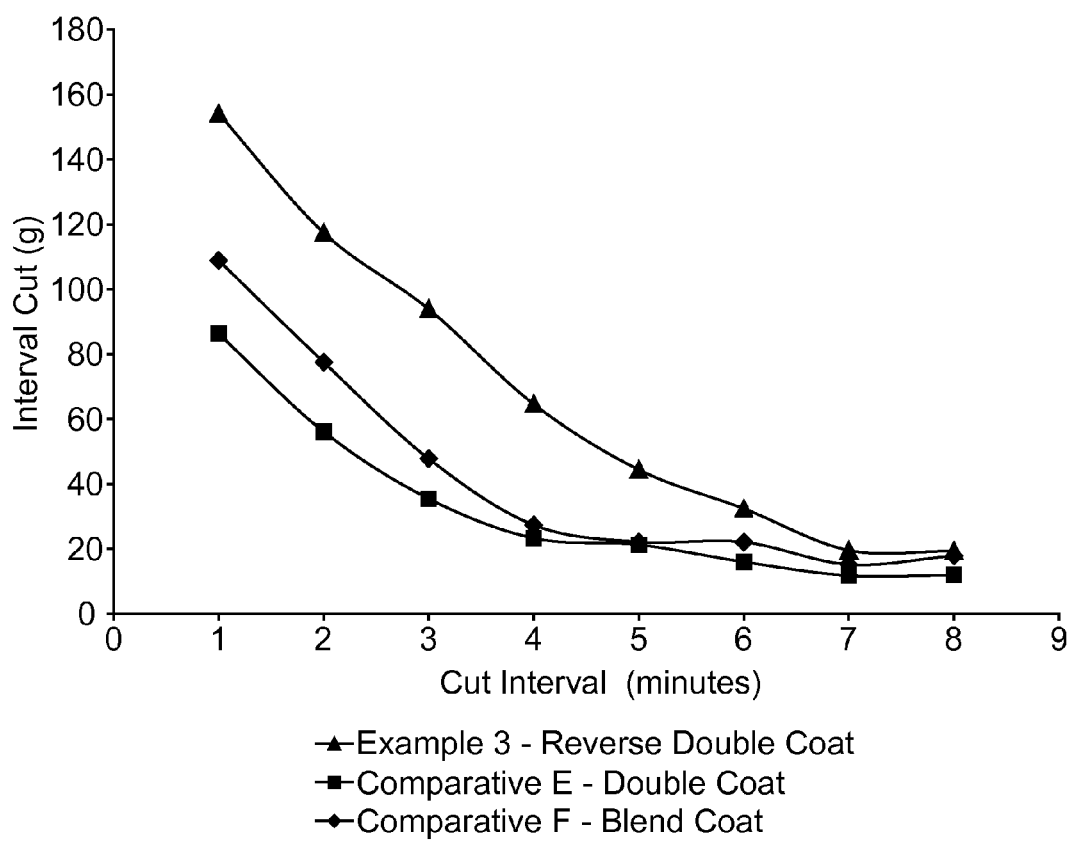
FIG. 4 illustrates grinding performance data.

The methods, compositions, and test results for inventive and comparative examples are shown in Table 1. Examples 1-9 and Comparative Examples A-J show the superior performance of reverse double coat constructions compared to open coat, double coat and blended mineral coated constructions for the set of shaped abrasive particles covered by this invention. FIG. 4 graphically illustrates the performance improvement for the reverse double coat method when using the shaped abrasive particles for stainless steel grinding when the abrasive discs are made by the three different methods.

Comparative Examples L-O show the poor performance of reverse double coat constructions compared to open coat, double coat and blend mineral coats when applied to shaped abrasive particles with shapes outside of the scope of this invention. Comparative Examples P-S show the poor performance of reverse double coat constructions compared to open coat, double coat and blend coated constructions when applied to conventional crushed grain abrasive constructions. Comparative Example K is a commercially available crushed grain abrasive disc included for performance comparison.

Example 1 demonstrates the cut performance of a "reverse double coat" disc incorporating an erodible filler grain. A disc was prepared by Disc Preparation Method A using Make Resin 1, Abrasive Grain 1, Filler Grain 1 and Size Resin 1 to provide a reverse double coat fiber disc construction comprising triangular shaped abrasive particles combined with a 20/25 mesh granular calcium carbonate filler grain. The disc prepared contained 8.8 grams of Abrasive Grain 1, and 16.3 grams of Filler Grain 1. The finished disc was tested using the Slide Action Test Method on 1018 mild steel workpieces with a normal force of 15.5+/−0.5 pounds. The first 1 minute of cut abraded 149.6 grams of metal. The peak 1 minute cut rate was 160.4 grams per minute during cycle 5. The total cumulative cut measured to a 70 gram per minute cut rate endpoint was 5741 grams and required 45 cycles.

Comparative Example A demonstrates the lower initial and peak cut rates of discs prepared in the conventional double coat coating order as compared to the disc described in Example 1. A disc was prepared by Disc Preparation Method B using Make Resin 1, Abrasive Grain 1, Filler Grain 1 and Size Resin 1 to provide a conventional double coat fiber disc construction comprising triangular shaped abrasive particles combined with a 20/25 mesh granular calcium carbonate filler grain. The disc prepared contained 8.9 grams of Abrasive Grain 1, and 23.7 grams of Filler Grain 1. The finished disc was tested using the Slide Action Test Method on 1018 mild steel workpieces with a normal force of 15.5+/−0.5 pounds. The first 1 minute of cut abraded 103.0 grams of metal. The peak 1 minute cut rate was 112.2 grams per minute during cycle 5. The total cumulative cut measured to a 70 gram per minute cut rate endpoint was 3120 grams and required 33 cycles. The cut rate of the disc described in Example 1 exceeded the cut rate of Comparative Example A for the first 24 cycles.

Comparative Example B demonstrates the lower initial and peak cut rates of discs prepared in the conventional mineral blend coating as compared to the disc described in Example 1. A disc was prepared by Disc Preparation Method C using Make Resin 1, Abrasive Grain 1, Filler Grain 1 and Size Resin 1 to provide a conventional mineral blend coated fiber disc construction comprising triangular shaped abrasive particles combined with a 20/25 mesh granular calcium carbonate filler grain. The disc prepared was coated with a blend consisting of 9.7 grams of Abrasive Grain 1, and 16.3 grams of Filler Grain 1. The total blend coated on the disc was 24 grams. Most of the uncoated material was Abrasive Grain 1. The finished disc was tested using the Slide Action Test Method on 1018 mild steel workpieces with a normal force of 15.5+/−0.5 pounds. The first 1 minute of cut abraded 119.3 grams of metal. The peak 1 minute cut rate was 141.3 grams per minute during cycles 3 and 6. The total cumulative cut measured to a 70 gram per minute cut rate endpoint was 8279 grams and required 72 cycles. The cut rate of the disc described in Example 1 exceeded the cut rate of Comparative Example B for the entire test.

Example 2 demonstrates the cut performance of a "reverse double coat" disc incorporating a hard filler grain. A disc was prepared by Disc Preparation Method A using Make Resin 1, Abrasive Grain 1, Filler Grain 2 and Size Resin 1 to provide a reverse double coat fiber disc construction comprising triangular shaped abrasive particles combined with ANSI grade 36 brown aluminum oxide filler grain. The disc prepared contained 13.7 grams of Abrasive Grain 1, 14.1 grams of Filler Grain 2 and 23.3 grams of Size Resin 1. The finished disc was tested using the Slide Action Test Method on 1018 mild steel workpieces with a normal force of 19+/−0.5 pounds. The first 1 minute of cut abraded 173.4 grams of metal. The peak 1 minute cut rate was 173.4 grams per minute during cycle 1. The total cumulative cut measured to a 70 gram per minute cut rate endpoint was 3056 grams and required 33 cycles.

Comparative Example C demonstrates the lower initial and peak cut rates of discs prepared in the conventional double coat coating order as compared to the disc described in Example 2. A disc was prepared by Disc Preparation Method B using Make Resin 1, Abrasive Grain 1, Filler Grain 2 and Size Resin 1 to provide a conventional double coat fiber disc construction comprising triangular shaped abrasive particles combined with ANSI grade 36 brown aluminum oxide filler grain. The disc prepared contained 15.3 grams of Abrasive Grain 1, 12.6 grams of Filler Grain 2 and 28.0 grams of Size Resin 1. The finished disc was tested using the Slide Action Test Method on 1018 mild steel workpieces with a normal force of 19+/−0.5 pounds. The first 1 minute of cut abraded 112.2 grams of metal. The peak 1 minute cut rate was 130.7 grams per minute during cycle 10. The total cumulative cut measured to a 70 gram per minute cut rate endpoint was 4116 grams and required 37 cycles. The cut rate of the disc described in Example 2 exceeded the cut rate of Comparative Example C for the first 16 cycles.

Comparative Example D demonstrates the lower initial and peak cut rates of discs prepared in the conventional mineral blend coating as compared to the disc described in Example 2. A disc was prepared by Disc Preparation Method C using Make Resin 1, Abrasive Grain 1, Filler Grain 2 and Size Resin 1 to provide a conventional mineral blend coated fiber disc construction comprising triangular shaped abrasive grains combined with ANSI grade 36 brown aluminum oxide filler grain. The disc prepared was coated with 29.7 grams of a 2:1 by weight blend of Filler Grain 2 and Abrasive Grain 1. The finished disc was tested using the Slide Action Test Method on 1018 mild steel workpieces with a normal force of 19+/−0.5 pounds. The first 1 minute of cut abraded 137.6 grams of metal. The peak 1 minute cut rate was 156.5 grams per minute during cycle 14. The total cumulative cut measured to a 70 gram per minute cut rate endpoint was 4954 grams and required 37 cycles. The cut rate of the disc described in Example 2 exceeded the cut rate of Comparative Example D for the first 11 cycles of the test.

Example 3 demonstrates performance advantages of a "reverse double coat" construction on a 304 stainless steel substrate. A disc was prepared by Disc Preparation Method A with optional supersize using Make Resin 1, Abrasive Grain 1, Filler Grain 2, Size Resin 1 and Supersize Resin 1 to provide a supersized reverse double coat fiber disc construction comprising triangular shaped abrasive particles combined with ANSI grade 36 brown aluminum oxide filler grain. The disc prepared contained 14.3 grams of Abrasive Grain 1, 13.1 grams of Filler Grain 2, 24.4 grams of Size Resin 1 and 10.1 grams of Supersize 1. The finished disc was tested using the Slide Action Test Method on 304 stainless steel workpieces with a normal force of 19+/−0.5 pounds. The first 1 minute of cut abraded 154.1 grams of metal. The peak 1 minute cut rate was 154.1 grams per minute during cycle 1. The total cumulative cut measured to a 20 gram per minute cut rate endpoint was 526 grams and required 7 cycles.

Comparative Example E demonstrates the lower initial and peak cut rates of discs prepared in the conventional double coat coating order as compared to the disc described in Example 3 when grinding 304 stainless steel. A disc was prepared by Disc Preparation Method B with optional supersize using Make Resin 1, Abrasive Grain 1, Filler Grain 2, Size Resin 1 and Supersize Resin 1 to provide a supersized conventional double coat fiber disc construction comprising triangular shaped abrasive particles combined with ANSI grade 36 brown aluminum oxide filler grain. The disc prepared contained 13.5 grams of Abrasive Grain 1, 14.8 grams of Filler Grain 2, 27.7 grams of Size Resin 1 and 10.0 grams of Supersize 1. The finished disc was tested using the Slide Action Test Method on 304 stainless steel workpieces with a normal force of 19+/−0.5 pounds. The first 1 minute of cut abraded 86.3 grams of metal. The peak 1 minute cut rate was 86.3 grams per minute during cycle 1. The total cumulative cut measured to a 20 gram per minute cut rate endpoint was 238 grams and required 6 cycles. The cut rate of the disc described in Example 3 exceeded the cut rate of Comparative Example E for the entire test.

Comparative Example F demonstrates the lower initial and peak cut rates of discs prepared in the conventional mineral blend coating as compared to the disc described in Example 3 when grinding 304 stainless steel. A disc was prepared by Disc Preparation Method C with optional supersize using Make Resin 1, Abrasive Grain 1, Filler Grain 2, Size Resin 1 and Supersize Resin 1 to provide a supersized, conventional mineral blend coated fibre disc construction comprising triangular shaped abrasive particles combined with ANSI grade 36 brown aluminum oxide filler grain. The disc prepared was coated with 29.2 grams of a 2:1 by weight blend of Filler Grain 2 and Abrasive Grain 1, 27.7 grams of Size Resin 1 and 10.0 grams of Supersize resin 1. The finished disc was tested using the Slide Action Test Method on 304 stainless steel workpieces with a normal force of 19+/−0.5 pounds. The first 1 minute of cut abraded 108.9 grams of metal. The peak 1 minute cut rate was 108.9 grams per minute during cycle 1. The total cumulative cut measured to a 20 gram per minute cut rate endpoint was 321 grams and required 7 cycles. The cut rate of the disc described in Example 3 exceeded the cut rate of Comparative Example F for the entire test.

Example 4 demonstrates the cut performance of a "reverse double coat" disc incorporating a gellable make resin. A disc was prepared by Disc Preparation Method D using Make Resin 2, Abrasive Grain 1, Filler Grain 2 and Size Resin 1 to provide a reverse double coat fibre disc construction comprising triangular shaped abrasive particles combined with an ANSI grade 26 brown aluminum oxide filler grain. The disc prepared contained 12.5 grams of Abrasive Grain 1, and 13.3 grams of Filler Grain 2 and 22 grams of Size Resin 1. The finished disc was tested using the Slide Action Test Method on 1018 mild steel workpieces with a normal force of 19+/−0.5 pounds. The first 1 minute of cut abraded 186.5 grams of metal. The peak 1 minute cut rate was 186.5 grams per minute during cycle 1. The total cumulative cut measured to a 70 gram per minute cut rate endpoint was 2977 grams and required 21 cycles.

Comparative Example G demonstrates the lower initial and peak cut rates of discs prepared in the conventional double coat coating order as compared to the disc described in Example 4. A disc was prepared by Disc Preparation Method E using Make Resin 2, Abrasive Grain 1, Filler Grain 2 and Size Resin 1 to provide a conventional double coat fiber disc construction comprising triangular shaped abrasive particles combined with ANSI grade 36 brown aluminum oxide filler grain. The disc prepared contained 12.2 grams of Abrasive Grain 1, 14.6 grams of Filler Grain 2 and 26.5 grams of Size Resin 1. The finished disc was tested using the Slide Action Test Method on 1018 mild steel workpieces with a normal force of 19+/−0.5 pounds. The first 1 minute of cut abraded 110.1 grams of metal. The peak 1 minute cut rate was 130.5 grams per minute during cycle 16. The total cumulative cut measured to a 70 gram per minute cut rate endpoint was 3728 grams and required 33 cycles. The cut rate of the disc described in Example 4 exceeded the cut rate of Comparative Example G for the first 15 cycles.

Example 5 demonstrates the performance advantages of a "reverse double coat" construction incorporating a gellable make resin when grinding a 304 stainless steel substrate. A disc was prepared by Disc Preparation Method D with optional supersize using Make Resin 2, Abrasive Grain 1, Filler Grain 2, Size Resin 1 and Supersize Resin 1 to provide a supersized reverse double coat fiber disc construction comprising triangular shaped abrasive particles combined with ANSI grade 36 brown aluminum oxide filler grain. The disc prepared contained 13.8 grams of Abrasive Grain 1, 13.0 grams of Filler Grain 2, 21.9 grams of Size Resin 1 and 10.1 grams of Supersize 1. The finished disc was tested using the Slide Action Test Method on 304 stainless steel workpieces with a normal force of 19+/−0.5 pounds. The first 1 minute of cut abraded 181.7 grams of metal. The peak 1 minute cut rate was 181.7 grams per minute during cycle 1. The total cumulative cut measured to a 20 gram per minute cut rate endpoint was 585 grams and required 7 cycles.

Comparative Example H demonstrates the lower initial and peak cut rates of discs prepared in the conventional double coat coating order as compared to the disc described in Example 5 when grinding 304 stainless steel. A disc was prepared by Disc Preparation Method E with optional supersize using Make Resin 2, Abrasive Grain 1, Filler Grain 2, Size Resin 1 and Supersize Resin 1 to provide a supersized conventional double coat fiber disc construction comprising triangular shaped abrasive particles combined with ANSI grade 36 brown aluminum oxide filler grain. The disc prepared contained 13.8 g grams of Abrasive Grain 1, 14.3 grams of Filler Grain 2, 25.6 grams of Size Resin 1 and 10.1 grams of Supersize 1. The finished disc was tested using the Slide Action Test Method on 304 stainless steel workpieces with a normal force of 19+/−0.5 pounds. The first 1 minute of cut abraded 98.6 grams of metal. The peak 1 minute cut rate was 98.6 grams per minute during cycle 1. The total cumulative cut measured to a 20 gram per minute cut rate endpoint was 255 grams and required 5 cycles. The cut rate of the disc described in Example 5 exceeded the cut rate of Comparative Example H for the entire test.

Example 6 demonstrates the increased efficiency of abrasive grain use in "reverse double coat" performance optimized constructions as compared to single coat abrasive constructions. A disc was prepared by Disc Preparation Method D using Make Resin 2, Abrasive Grain 1, Filler Grain 1 and Size Resin 1 to provide a reverse double coat fiber disc construction comprising triangular shaped abrasive particles combined with a 20/25 mesh granular calcium carbonate filler grain. The disc prepared contained 7.9 grams of Abrasive Grain 1, 20.5 grams of Filler Grain 1, and 14.9 grams of Size Resin 1. The finished disc was tested using the Slide Action Test Method on 1018 mild steel workpieces with a normal force of 15.5+/−0.5 pounds. The first minute of cut abraded 128.5 grams of metal. The peak cut rate was 144.8 grams per minute during cycle 6. The total cumulative cut measured to an 80 gram per cycle cut rate endpoint was 6251 grams and required 53 cycles.

Comparative Example I demonstrates the performance of a disc made by single coating only shaped abrasive particles without filler grain at a performance optimized mineral weight. A disc was prepared by Disc Preparation Method H using Make Resin 2, Abrasive Grain 1, and Size Resin 1 to provide a conventional single coated fiber disc construction comprising triangular shaped abrasive particles. The disc prepared contained 17.2 grams of Abrasive Grain 1 and 12.9 grams of Size Resin 1. The finished disc was tested using the Slide Action Test Method on 1018 mild steel workpieces with a normal force of 15.5+/−0.5 pounds. The first minute of cut abraded 140.6 grams of metal. The peak cut rate was 161.5 grams per minute during cycle 7. The total cumulative cut measured to an 80 gram per cycle cut rate endpoint was 5178 grams and required 46 cycles. The overall abrading performance is similar to that of Example 6, but required more than twice the shaped abrasive particle usage.

Comparative Example J demonstrates the performance of a disc made by single coating only shaped abrasive particles without filler grain at an abrasive grain weight comparable to that used in a Example 6. A disc was prepared by Disc Preparation Method H using Make Resin 2, Abrasive Grain 1, and Size Resin 1 to provide a conventional single coat fiber disc construction comprising triangular shaped abrasive particles. The disc prepared contained 8.7 grams of Abrasive Grain 1 and 8.2 grams Size Resin 1. The finished disc was tested using the Slide Action Test Method on 1018 mild steel workpieces with a normal force of 15.5+/−0.5 pounds. The first minute of cut abraded 152.2 grams of metal. The peak cut rate was 152.2 grams per minute during cycle 1. The total cumulative cut measured to a 70 gram per minute cut rate endpoint was 1652 grams and required 15 cycles. At abrasive grain levels comparable to Example 6, initial cut rates are high, but drop rapidly and total cut is only about a quarter of that obtained in the reverse double coat construction of Example 6.

Example 7 demonstrates the cut performance of a "reverse double coat" disc incorporating granular cryolite as an erodible filler grain. A disc was prepared by Disc Preparation Method A using Make Resin 1, Abrasive Grain 1, Filler Grain 3 and Size Resin 1 to provide a reverse double coat fiber disc construction comprising triangular shaped abrasive particles combined with a 20/25 mesh granular cryolite filler grain. The disc prepared contained 10.3 grams of Abrasive Grain 1, 13.8 grams of Filler Grain 3 and 12.6 grams of Size Resin 1. The finished disc was tested using the Slide Action Test Method on 1018 mild steel workpieces with a normal force of 15.5+/−0.5 pounds using 2 minute cut cycles. The first 2 minutes of cut abraded 267.8 grams of metal. The peak 2 minute cut rate was 288.6 grams during cycle 6. The total cumulative cut measured to a 140 gram per 2 minute cut rate endpoint was 4713 grams and required 20 two minute cycles.

Example 8 demonstrates the cut performance of a "reverse double coat" disc incorporating a finer grade granular calcium carbonate as an erodible filler grain. A disc was prepared by Disc Preparation Method A using Make Resin 1, Abrasive Grain 1, Filler Grain 4 and Size Resin 1 to provide a reverse double coat fiber disc construction comprising triangular shaped abrasive particles combined with a 30/35 mesh granular calcium carbonate filler grain. The disc prepared contained 10.2 grams of Abrasive Grain 1, 10.3 grams of Filler Grain 4 and 8.8 grams of Size Resin 1. The finished disc was tested using the Slide Action Test Method on 1018 mild steel workpieces with a normal force of 15.5+/−0.5 pounds using 2 minute cut cycles. The first 2 minutes of cut abraded 330.3 grams of metal. The peak 2 minute cut rate was 347.5 grams during cycle 4. The total cumulative cut measured to a 140 gram per 2 minute cut rate endpoint was 5175 grams and required 19 two minute cycles.

Example 9 demonstrates the cut performance of a "reverse double coat" disc incorporating granular bauxite as a filler grain. A disc was prepared by Disc Preparation Method A using Make Resin 1, Abrasive Grain 1, Filler Grain 5 and Size Resin 1 to provide a reverse double coat fiber disc construction comprising triangular shaped abrasive particles combined with a grade 36 granular bauxite filler grain. The disc prepared contained 10.4 grams of Abrasive Grain 1, 16.2 grams of Filler Grain 5 and 10.5 grams of Size Resin 1. The finished disc was tested using the Slide Action Test Method on 1018 mild steel workpieces with a normal force of 15.5+/−0.5 pounds using 2 minute cut cycles. The first 2 minutes of cut abraded 273.7 grams of metal. The peak 2 minute cut rate was 283.3 grams during cycle 2. The total cumulative cut measured to a 140 gram per 2 minute cut rate endpoint was 2819 grams and required 12 two minute cycles.

Comparative Example K contrasts cut performance with a commercially available, premium performance, fiber disc incorporating conventional crushed ceramic grain abrasive. The disc was obtained from 3M Company, St. Paul, Minn., under the trade designation "988C Grade 36 Fiber Disc". The 988C disc was tested using the Slide Action Test Method on 1018 mild steel workpieces with a normal force of 15.5+/−0.5 pounds. The first 1 minute of cut abraded 100.1 grams of metal. The peak 1 minute cut rate was 131.4 grams per minute during cycle 4. The total cumulative cut measured to a 70 gram per minute cut rate endpoint was 1085 grams and required 10 cycles.

Comparative Example L demonstrates the cut performance of a "reverse double coat" disc incorporating a shaped abrasive particle outside of the claims of this invention. A disc was prepared by Disc Preparation Method A using Make Resin 1, Abrasive Grain 2, Filler Grain 6 and Size Resin 1 to provide a reverse double coat fiber disc construction comprising an elongated diamond shaped abrasive particle combined with ANSI grade 100 brown aluminum oxide filler grain. The disc prepared contained 7.0 grams of Abrasive Grain 2, and 4.8 grams of Filler Grain 6. The finished disc was tested using the Slide Action Test Method on 1018 mild steel workpieces with a normal force of 12+/−0.5 pounds. The first 1 minute of cut abraded 85.5 grams of metal. The peak 1 minute cut rate was 85.5 grams per minute during cycle 1. The total cumulative cut measured to a 70% of initial cut rate endpoint was 336 grams and required 5 cycles.

Comparative Example M demonstrates the cut performance of a conventional "double coat" disc incorporating a shaped abrasive grain particle outside of the claims of this invention. A disc was prepared by Disc Preparation Method B using Make Resin 1, Abrasive Grain 2, Filler Grain 6 and Size Resin 1 to provide a double coat fiber disc construction comprising an elongated diamond shaped abrasive particles combined with ANSI grade 100 brown aluminum oxide filler grain. The disc prepared contained 7.0 grams of Abrasive Grain 2, and 4.8 grams of Filler Grain 6. The finished disc was tested using the Slide Action Test Method on 1018 mild steel workpieces with a normal force of 12+/−0.5 pounds. The first 1 minute of cut abraded 103 grams of metal. The peak 1 minute cut rate was 103 grams per minute during cycle 1. The total cumulative cut measured to a 70% of initial cut rate endpoint was 1214 grams and required 14 cycles. This conventional double coat disc construction outperformed the "reverse double coat" disc of Comparative Example L in every respect.

Comparative Example N demonstrates the cut performance of a conventional "blended mineral coat" disc incorporating a shaped abrasive particle outside of the claims of this invention. A disc was prepared by Disc Preparation Method C using Make Resin 1, Abrasive Grain 2, Filler Grain 6 and Size Resin 1 to provide a blend coat fiber disc construction comprising an elongated diamond shaped abrasive particles combined with ANSI grade 100 brown aluminum oxide filler grain. The disc prepared contained 12.0 grams of a 7:5 blend of Abrasive Grain 2, and Filler Grain 6. The finished disc was tested using the Slide Action Test Method on 1018 mild steel workpieces with a normal force of 12+/−0.5 pounds. The first 1 minute of cut abraded 106.2 grams of metal. The peak 1 minute cut rate was 106.2 grams per minute during cycle 1. The total cumulative cut measured to a 70% of initial cut rate endpoint was 595 grams and required 7 cycles. This conventional mineral blend coat disc construction outperformed the "reverse double coat" disc of Comparative Example L in every respect.

Comparative Example O demonstrates the cut performance of a conventional "open coat" disc incorporating a shaped abrasive particle outside of the claims of this invention. A disc was prepared by Disc Preparation Method G using Make Resin 1, Abrasive Grain 2 and Size Resin 1 to provide an open coat fiber disc construction comprising an elongated diamond shaped abrasive particle. The disc prepared contained 7.5 grams of Abrasive Grain 2. The finished disc was tested using the Slide Action Test Method on 1018 mild steel workpieces with a normal force of 12+/−0.5 pounds. The first 1 minute of cut abraded 85 grams of metal. The peak 1 minute cut rate was 85 grams per minute during cycle 1. The total cumulative cut measured to a 70% of initial cut rate endpoint was 525 grams and required 8 cycles. This conventional open coat disc construction having comparable Abrasive Grain 2 content as the "reverse double coat" disc of Comparative Example L exhibited comparable performance.

Comparative Example P demonstrates the cut performance of a "reverse double coat" disc incorporating conventional crushed abrasive grain. A disc was prepared by Disc Preparation Method A using Make Resin 1, Abrasive Grain 3, Filler Grain 4 and Size Resin 1 to provide a "reverse double coated" fiber disc construction comprising a conventional crushed ceramic grain abrasive combined with a 30/35 mesh granular calcium carbonate filler grain. The disc prepared contained 14.0 grams of Abrasive Grain 3, 11.3 grams of Filler Grain 4 and 16.2 grams of Size Resin 1. The finished disc was tested using the Slide Action Test Method on 1018 mild steel workpieces with a normal force of 15.5+/−0.5 pounds. The first 1 minute of cut abraded 74.0 grams of metal. The peak 1 minute cut rate was 96.6 grams per minute during cycle 11. The total cumulative cut measured to a 70 g/minute cut rate endpoint was 4321 grams and required 53 cycles. The cut rate performance of this disc was lower than to the Comparative Examples Q, R and S over the life of the disc. This is indicative of poor abrasive grain orientation.

Comparative Example Q demonstrates the cut performance of a "double coat" disc incorporating conventional crushed abrasive grain. A disc was prepared by Disc Preparation Method B using Make Resin 1, Abrasive Grain 3, Filler Grain 4 and Size Resin 1 to provide a double coated fiber disc construction comprising a conventional crushed ceramic grain abrasive combined with a 30/35 mesh granular calcium carbonate filler grain. The disc prepared contained 12.1 grams of Abrasive Grain 3, 9.9 grams of Filler Grain 4 and 15.8 grams of Size Resin 1. The finished disc was tested using the Slide Action Test Method on 1018 mild steel workpieces with a normal force of 15.5+/−0.5 pounds. The first 1 minute of cut abraded 79.2 grams of metal. The peak 1 minute cut rate was 108 grams per minute during cycle 12. The total cumulative cut measured to a 70 g/minute cut rate endpoint was 2597 grams and required 28 cycles. The cut rate performance of this disc was comparable to the open coat Comparative Example S. This is indicative of good abrasive grain orientation.

provide a open coated fiber disc construction comprising a conventional crushed ceramic grain abrasive. The disc prepared contained 13.6 grams of Abrasive Grain 3 and 11.9 grams of Size Resin 1. The finished disc was tested using the Slide Action Test Method on 1018 mild steel workpieces with a normal force of 15.5+/−0.5 pounds. The first 1 minute of cut abraded 90.9 grams of metal. The peak 1 minute cut rate was 119.7 grams per minute during cycle 9. The total cumulative cut measured to a 70 g/minute cut rate endpoint was 2841 grams and required 28 cycles.

TABLE 1

| EX. | PREPARATION METHOD | WORKPIECE | MAKE RESIN | ABRASIVE GRAIN | FILLER GRAIN | SIZE RESIN | SUPERSIZE RESIN | INITIAL CUT, g | PEAK CUT, g | TOTAL CUT, g |
|---|---|---|---|---|---|---|---|---|---|---|
| 1 | A | 1018 steel | 1 | 1 | 1 | 1 | None | 149.6 | 160.4 | 5741 |
| Comp. A | B | 1018 steel | 1 | 1 | 1 | 1 | None | 103 | 112.2 | 3120 |
| Comp. B | C | 1018 steel | 1 | 1 | 1 | 1 | None | 119.3 | 141.3 | 8279 |
| 2 | A | 1018 steel | 1 | 1 | 2 | 1 | None | 173.4 | 173.4 | 3056 |
| Comp. C | B | 1018 steel | 1 | 1 | 2 | 1 | None | 112.2 | 130.7 | 4116 |
| Comp. D | C | 1018 steel | 1 | 1 | 2 | 1 | None | 137.6 | 156.5 | 4954 |
| 3 | A | 304 stainless | 1 | 1 | 2 | 1 | 1 | 154.1 | 154.1 | 526 |
| Comp. E | B | 304 stainless | 1 | 1 | 2 | 1 | 1 | 86.3 | 86.3 | 238 |
| Comp. F | C | 304 stainless | 1 | 1 | 2 | 1 | 1 | 108.9 | 108.9 | 321 |
| 4 | D | 1018 steel | 2 | 1 | 2 | 1 | None | 186.5 | 186.5 | 2977 |
| Comp. G | E | 1018 steel | 2 | 1 | 2 | 1 | None | 110.1 | 130.5 | 3728 |
| 5 | D | 304 stainless | 2 | 1 | 2 | 1 | 1 | 181.7 | 181.7 | 585 |
| Comp. H | E | 304 stainless | 2 | 1 | 2 | 1 | 1 | 98.6 | 98.6 | 255 |
| 6 | D | 1018 steel | 2 | 1 | 1 | 1 | None | 128.5 | 144.8 | 6251 |
| Comp. I | H | 1018 steel | 2 | 1 | None | 1 | None | 140.6 | 161.5 | 5178 |
| Comp. J | H | 1018 steel | 2 | 1 | None | 1 | None | 152.2 | 152.2 | 1652 |
| 7[1] | A | 1018 steel | 1 | 1 | 3 | 1 | None | 267.8 | 288.6 | 4713 |
| 8[1] | A | 1018 steel | 1 | 1 | 4 | 1 | None | 330.3 | 347.5 | 5175 |
| 9[1] | A | 1018 steel | 1 | 1 | 5 | 1 | None | 273.7 | 283.3 | 2819 |
| Comp. K | NA[2] | 1018 steel | NA[2] | NA[2] | NA[2] | NA[2] | NA[2] | 100.1 | 131.4 | 1085 |
| Comp. L | A | 1018 steel | 1 | 2 | 6 | 1 | None | 85.5 | 85.5 | 336 |
| Comp. M | B | 1018 steel | 1 | 2 | 6 | 1 | None | 103 | 103 | 1214 |
| Comp. N | C | 1018 steel | 1 | 2 | 6 | 1 | None | 106.2 | 106.2 | 595 |
| Comp. O | G | 1018 steel | 1 | 2 | None | 1 | None | 85 | 85 | 525 |
| Comp. P | A | 1018 steel | 1 | 3 | 4 | 1 | None | 74 | 96.6 | 4321 |
| Comp. Q | B | 1018 steel | 1 | 3 | 4 | 1 | None | 79.2 | 108 | 2597 |
| Comp. R | C | 1018 steel | 1 | 3 | 4 | 1 | None | 81.5 | 117.7 | 3060 |
| Comp. S | G | 1018 steel | 1 | 3 | None | 1 | None | 90.9 | 119.7 | 2841 |

[1]2-minute test cycle
[2]Not applicable - Commercial Product

Comparative Example R demonstrates the cut performance of a "blended mineral coat" disc incorporating conventional crushed abrasive grain. A disc was prepared by Disc Preparation Method C using Make Resin 1, Abrasive Grain 3, Filler Grain 4 and Size Resin 1 to provide a blend mineral coated fiber disc construction comprising a conventional crushed ceramic grain abrasive combined with a 30/35 mesh granular calcium carbonate filler grain. The disc prepared contained 20.9 grams of a 5:4 blend of Abrasive Grain 3 and Filler Grain 4 and 14.8 grams of Size Resin 1. The finished disc was tested using the Slide Action Test Method on 1018 mild steel workpieces with a normal force of 15.5+/−0.5 pounds. The first 1 minute of cut abraded 81.5 grams of metal. The peak 1 minute cut rate was 117.7 grams per minute during cycle 11. The total cumulative cut measured to a 70 g/minute cut rate endpoint was 3060 grams and required 31 cycles. The cut rate performance of this disc was comparable to the open coat Comparative Example S. This is indicative of good abrasive grain orientation.

Comparative Example S demonstrates the cut performance of an open coat disc incorporating conventional crushed abrasive grain. A disc was prepared by Disc Preparation Method G using Make Resin 1, Abrasive Grain 3 and Size Resin 1 to Other modifications and variations to the present disclosure may be practiced by those of ordinary skill in the art, without departing from the spirit and scope of the present disclosure, which is more particularly set forth in the appended claims. It is understood that aspects of the various embodiments may be interchanged in whole or part or combined with other aspects of the various embodiments. All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A method of making a coated abrasive article comprising the step of:
    applying a make coat to a first major surface of a backing;
    applying shaped abrasive particles to the make coat to form a first abrasive layer consisting essentially of shaped abrasive particles;
    applying diluent particles to the make coat over the shaped abrasive particles to form a final abrasive layer;

applying a size coat over the final abrasive layer;
curing the make and size coats; and
wherein the shaped abrasive particles comprise a vertex opposite a base and a width of the shaped abrasive particle tapers from the base to the vertex.

2. The method of claim 1 wherein the diluent particles comprise a maximum dimension and the maximum dimension is less than a length of the shaped abrasive particles along a longitudinal axis between the base and the vertex.

3. The method of claim 1 wherein the first abrasive layer comprises an open coat.

4. The method of claim 3 wherein the first abrasive layer open coat comprises between 30 percent to 60 percent of its closed coat density.

5. The method of claim 1, wherein the final abrasive layer comprises a closed coat.

6. The method of claim 1, wherein the shaped abrasive particles comprise triangles.

7. The method of claim 6 wherein the triangles comprise a first face, a second face and a sloping sidewall having an angle α between the second face and the sloping sidewall and the angle α is between 95 degrees to 135 degrees.

8. The method of claim 1 wherein the make coat is at least partially cured before applying the size coat.

9. A coated abrasive article comprising:
a backing having a first major surface;
a make coat applied to the backing;
a final abrasive layer attached to the make coat, the final abrasive layer comprising shaped abrasive particles and diluent particles;
a size coat applied over the final abrasive layer;
the shaped abrasive particles comprising a first face, a second face, and a sloping sidewall; the first face and the second face comprising a triangular perimeter; and
wherein a majority of the shaped abrasive particles are leaning having an orientation angle β of less than 90 degrees relative to the first major surface.

10. The coated abrasive article of claim 9 wherein the orientation angle β is between about 50 degrees to about 85 degrees.

11. The coated abrasive article of claim 9 wherein the orientation angle β is between about 75 degrees to about 85 degrees.

12. The coated abrasive article of claim 9, wherein greater than 80 percent of the shaped abrasive particles are leaning.

13. The coated abrasive article of claim 9, wherein the shaped abrasive particles comprise 30 percent to 60 percent of the closed coat density of the final abrasive layer.

* * * * *

UNITED STATES PATENT AND TRADEMARK OFFICE
CERTIFICATE OF CORRECTION

PATENT NO.        : 9,017,150 B2
APPLICATION NO.   : 13/503091
DATED             : April 28, 2015
INVENTOR(S)       : Steven Keipert Page 1 of 1

It is certified that error appears in the above-identified patent and that said Letters Patent is hereby corrected as shown below:

In the Specification

Column 8
Line 52, delete "less then" and insert -- less than --, therefor.

Column 9
Line 58, delete "manor" and insert -- manner --, therefor.

Column 10
Line 64, delete "JO." and insert -- IO. --, therefor.

Signed and Sealed this
Twenty-second Day of March, 2016

Michelle K. Lee
*Director of the United States Patent and Trademark Office*